United States Patent
Burg et al.

(10) Patent No.: US 12,380,067 B2
(45) Date of Patent: Aug. 5, 2025

(54) CLIENT-SIDE HASHSET CHANGE DETECTION

(71) Applicant: MICROSOFT TECHNOLOGY LICENSING, LLC., Redmond, WA (US)

(72) Inventors: David Burg, Sammamish, WA (US); Shivam Jindal, Jaipur (IN); Rama Krishna Rayudu, Sammamish, WA (US); Praveen Srivastava, Bengaluru (IN)

(73) Assignee: Microsoft Technology Licensing, LLC., Redmond, WA (US)

( * ) Notice: Subject to any disclaimer, the term of this patent is extended or adjusted under 35 U.S.C. 154(b) by 147 days.

(21) Appl. No.: 18/088,126

(22) Filed: Dec. 23, 2022

(65) Prior Publication Data

US 2024/0211443 A1    Jun. 27, 2024

(51) Int. Cl.
*G06F 16/176* (2019.01)
*G06F 16/14* (2019.01)
*G06F 16/182* (2019.01)

(52) U.S. Cl.
CPC .......... *G06F 16/176* (2019.01); *G06F 16/152* (2019.01); *G06F 16/183* (2019.01)

(58) Field of Classification Search
CPC ..... G06F 16/176; G06F 16/152; G06F 16/183
See application file for complete search history.

(56) References Cited

U.S. PATENT DOCUMENTS

| | | | |
|---|---|---|---|
| 6,704,730 B2 | 3/2004 | Moulton et al. | |
| 7,860,843 B2 | 12/2010 | Dodd et al. | |
| 8,452,736 B2 | 5/2013 | Reddy et al. | |
| 8,943,506 B2 | 1/2015 | Tang et al. | |
| 10,482,067 B2 | 11/2019 | Penangwala et al. | |
| 11,003,632 B2 | 5/2021 | Jewell et al. | |
| 11,301,431 B2 * | 4/2022 | Jewell ................. | G06F 16/1734 707/689 |

(Continued)

FOREIGN PATENT DOCUMENTS

| | | |
|---|---|---|
| CN | 102193823 A | 9/2011 |
| CN | 113641988 A | 11/2021 |

(Continued)

OTHER PUBLICATIONS

"Build-Systems Should Use Hashes Over Timestamps", Retrieved From: https://medium.com/@buckaroo.pm/build-systems-should-use-hashes-over-timestamps-54d09f6f2c4, Oct. 26, 2018, 5 Pages.

(Continued)

*Primary Examiner* — Yuk Ting Choi

(57) ABSTRACT

The detection of a change to a shared file of a file hosting service communicating only through a file transfer protocol is performed on a client-side device. The client-side device obtains the metadata of each shared file of a directory at each periodic interval. The client-side device generates a hashset for the directory at each periodic interval where the hashset includes a hash value for each file's metadata. If the hash of a file at a current time t is contained in the immediately preceding hashset at t−1 but not in the hashset of t−2 then the file is determined to have changed.

17 Claims, 5 Drawing Sheets

(56) References Cited

U.S. PATENT DOCUMENTS

| | | | |
|---|---|---|---|
| 11,880,348 B1* | 1/2024 | Roy | G06F 16/1805 |
| | | | 707/689 |
| 2008/0005195 A1* | 1/2008 | Li | G06F 16/178 |
| | | | 707/999.203 |
| 2011/0099152 A1* | 4/2011 | Law | G06F 16/285 |
| | | | 707/689 |
| 2014/0074783 A1 | 3/2014 | Alsina et al. | |
| 2016/0085769 A1* | 3/2016 | Penangwala | G06F 16/178 |
| | | | 707/610 |
| 2017/0060936 A1* | 3/2017 | Gammans | G06F 16/2358 |
| | | | 707/689 |
| 2018/0150477 A1* | 5/2018 | Jewell | G06F 16/172 |
| | | | 707/610 |
| 2018/0349408 A1* | 12/2018 | Jewell | G06F 16/1734 |
| | | | 707/610 |
| 2022/0237084 A1* | 7/2022 | Bhagi | G06F 11/2097 |
| | | | 707/610 |

FOREIGN PATENT DOCUMENTS

| | | |
|---|---|---|
| EP | 2646943 B1 | 11/2015 |
| JP | 2010287158 A | 12/2010 |

OTHER PUBLICATIONS

Suharjito, et al., "File Synchronization Algorithm Using Hash Transfer Synchronization Method in Distributed System", In Journal of International Review on Computers and Software, vol. 11, Issue 4, Apr. 2016, pp. 310-315.

\* cited by examiner

CLIENT-SIDE HASHSET CHANGE DETECTION

BACKGROUND

File transfer pertains to the exchange of data files between different computing systems over a network. File transfer is controlled by a communication protocol having rules that govern how a file is transmitted between the two computing systems. File transfer protocol (FTP) is one such network protocol for transmitting files over Transmission Control Protocol/Internet Protocol (TCP/IP) connections. FTP is often used in the transmission of files between computing systems that have different file configurations, such as different naming conventions, different directory structures, and different ways to represent the data. FTP overcomes these differences.

The FTP protocol is limited to file transfers and does not include web application programming interfaces (APIs) that process the data file on the remote server. This limitation presents problems in detecting a change to a shared file hosted by a file hosting server. The client device that uses the shared file cannot use an API to readily detect a change to a file. Instead, the client device is left relying on the timestamp associated with a modification of the shared file that is produced by the file hosting server. However, the reliance on a server-generated timestamp results in missed changes due to the timestamp implementation differences between the file hosting server and the client device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A client device that utilizes a shared file from a file hosting service detects changes to the shared files of the file hosting service through the detection of changes made to the hash values of the metadata of the file at periodic time intervals. The file hosting service utilizes a network protocol that only supports a file transfer protocol and no support for application programming interfaces (APIs). The client device monitors the shared files of a directory of the file hosting service by periodically downloading each file's metadata. The client-side device generates a hashset for the directory at each periodic polling interval where the hashset includes a hash value for each file's metadata. If the hash of a file at a current time t is contained in the immediately preceding hashset at t−1 but not in the hashset of t−2 then the file is determined to have changed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Aspects of the present disclosure pertain to the detection of a change to a file of a remote file server on a client-side device where the network protocol of the remote file server does not support API access.

Figure 1:
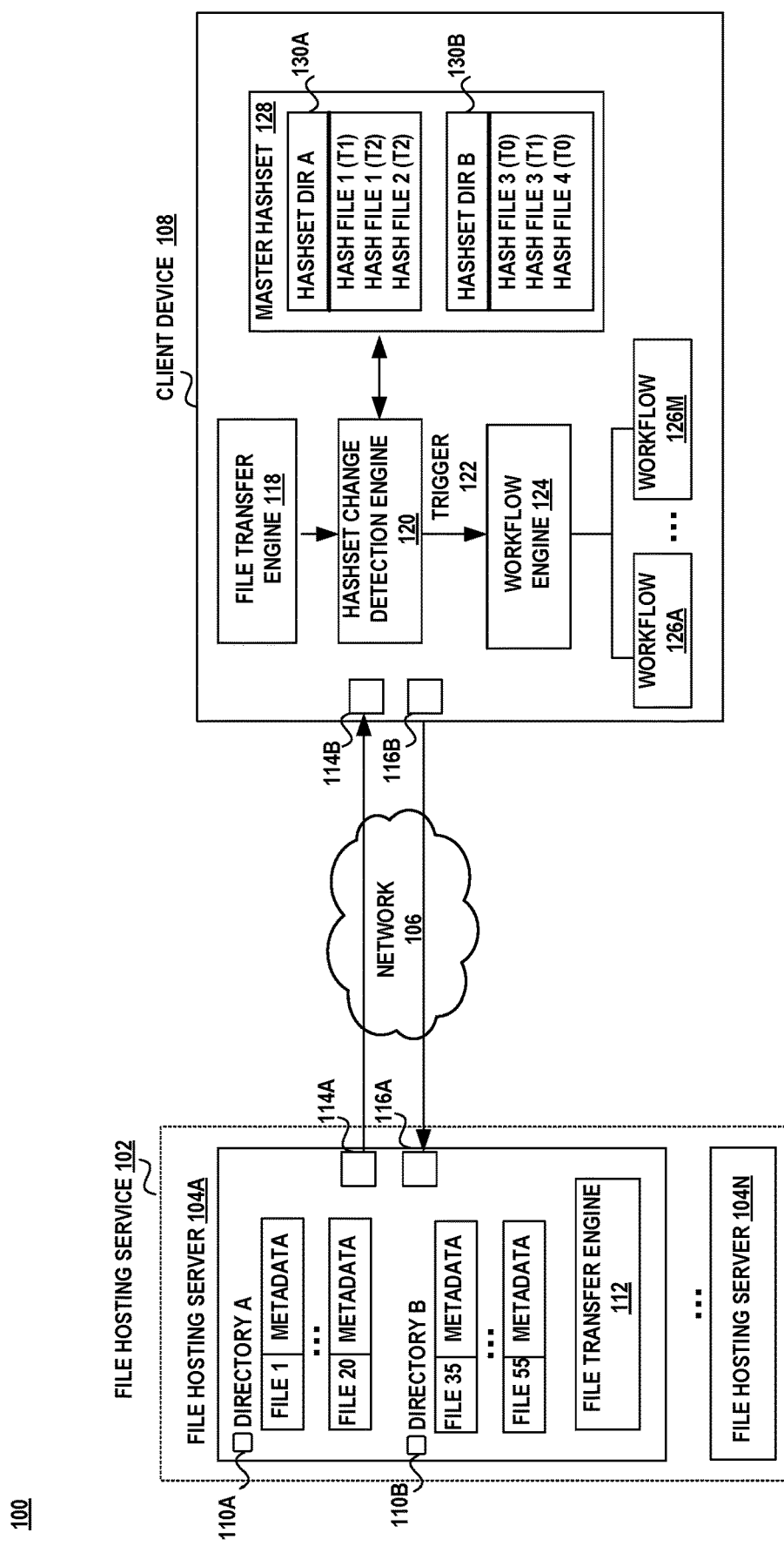
FIG. 1 is a schematic diagram illustrating an exemplary system for client-side hashset change detection.

FIG. 1 illustrates a block diagram of an exemplary system 100 for client-side file change detection. The system 100 includes a file hosting service 102 connected through a network 106 to a client device 108. The file hosting service 102 consists of multiple file hosting servers 104A-104N ("104"). A file hosting server 104 stores electronic files of data that are accessible through the network 106 via a network protocol. The files of a file hosting server 104 are stored in a directory or folder, sub-folders, or combinations thereof. A directory is an organization of files into a hierarchy of folders. The data can consist of text documents, images, videos, etc. An example of such a file hosting service is the Azure file hosting service.

Each file of a file hosting server 104 is associated with metadata which is data that describes a file. In one aspect, the metadata includes the file name, the file size, creation timestamp, modification timestamp, and file attributes. The creation timestamp is the time the file was created. The modification timestamp is the time the file was last modified. The creation timestamp and the modification timestamp are both created based on the clock of the file hosting server.

The file attributes are another type of metadata. In the FTP protocol, the attributes include a flag that indicates whether a file is a directory and three groups of read-write-execute permission flags for a respective file owner, file group or 'other.' The permissions are denoted in a string, such as "drwxrwxrwx", which indicates a directory that everyone can read, write and execute) or "-rwx-----", a file which only the owner can read, write and execute, or "-rw-rw-rw-", a file which can be read and written by anyone but which cannot be executed by anyone.

Different protocols and operating systems have their own set of attributes. For example, in the Windows operating system, the file attributes include a flag to indicate whether the file is an archive, a flag to indicate a directory, a flag to indicate whether the file is hidden, a flag to indicate whether the file is read-only, a flag to indicate whether the file is a system file, and so on.

As shown in FIG. 1, file hosting server 102A includes two directories, directory A 110A and directory B 110B. Directory A includes files 1 through files 20 and directory B includes files 35 through files 55, with each file associated with a metadata file.

A file hosting server 104 includes a file transfer engine 112 that receives and responds to file transfer requests. In one aspect, the file hosting server 104 communicates through the FTP network protocol. It should be noted that the techniques described herein are not limited to FTP and that other file transfer protocols for file sharing without support for APIs may be employed such as, without limitation, Secure Shell File Transfer Protocol (SFTP) and Samba. SFTP is a file transfer standard based on Secure Shell (SSH)

protocol. Samba is a network protocol based on the Server Message Block (SMB) network protocol.

FTP uses two TCP connections: a control connection 114A-114B ("114") which is used to send user ids, passwords and commands over TCP port number 21; and a data connection 116A, 116B ("116") used to transmit a file through TCP port number 20. An FTP session is started between a client device 108 and a file hosting server 104 when the client device 108 initiates a control TCP connection with the file hosting server 102 to send control information. The file hosting server 102 responds by initiating a data connection with the client device 108. A single file is sent over the one data connection.

FTP differs from other network protocols that utilize APIs. A web service is set of open-source protocols and standards for exchanging data between system or application through APIs. An API is a software interface that allows two applications to interact with each other without any user involvement. A web API is a server-side programmatic interface that includes endpoints to request and respond to messages where the endpoints are exposed by an HTTP-based web server.

HTTP differs from FTP. HTTP is a standard that defines the rules on how web pages are transferred from a web server to a web browser through the Internet. HTTP is used to access web sites on the Internet whereas FTP is used to upload and download files between a client and a server. HTTP establishes a data only connection whereas FTP uses two connections. When using HTTP, HTTP appears in a Uniform Resource Locator ("URL") and when using FTP, FTP and not HTTP appears in a URL.

A Representational State Transfer (REST) API is an API that conforms to the REST design principles. REST APIs communicate using HTTP-based requests to perform functions for processing data, such as creating, reading, updating, and deleting records within a resource. For example, a REST API would use a GET request to retrieve a record, a POST request to create one, a PUT request to update a record, and a DELETE request to delete one. All HTTP methods can be used in API calls. FTP differs from the REST APIs since it does not perform functions to process data other than the transfer of files, such as uploading and downloading files.

The client device 108 is a computing device that adheres to the client-side of the file transfer protocol. The client device 108 may include a TCP control connection 114B, a TCP data connection 116B, a file transfer engine 118, a hash set change detection engine 120, a workflow engine 124, several workflow applications 126A-126M, and a master hashset 128.

The TCP control port 114B and the TCP data port 116B are the control and data connections of the TCP. The file transfer engine 118 facilitates the file transfers between the file hosting service 102 and the client device 108 using the TCP control port 114B and the TCP data port 116B.

The master hashset 128 is a listing of the file hashes for each file of each directory of the file hosting service 102. In an aspect, the file hashes are a hash of the file's metadata. A hash is a value obtained from application of a hash function to a file's metadata to obtain a smaller and compact representation of the metadata referred to as a file hash. One of various types of hash functions may be used such as without limitation derivatives of the Merkle-Damgard hash function, MD2, MD4, MD5, MD6, SHA-0, SHA-1, SHA-2, SHA-3 or a combination thereof. A file hash is used to detect the difference between each file at each time point. The comparison of the file hash at different time points is used to detect a change in the contents of the file.

The master hashset 128 includes a hashset 130A-130B ("130") for each directory that includes the file hashes of each file of a directory. The hash set change detection engine 120 detects a change to a file in the file hosting service 120 using the hashsets of the master hashset 128. Each hashset for each directory is associated with a point in time or polling interval. The master hashset 128 maintains a hashset for each directory for two successive time points.

As shown in FIG. 1, the master hashset 128 includes a hashset for directory A 130A which includes a file hash for file 1 at time $t_1$ and time $t_2$ and a file hash for file 2 at time $t_2$. The hashset for directory B includes a file hash for file 3 at time $t_0$ and $t_1$ and a file hash for file 4 at time $t_0$. For this illustration, the initial time point starts at $t_0$ followed by $t_1$ and then $t_2$.

In one aspect, the hashset change detection engine 120 interacts with a workflow engine 124. The workflow engine 124 receives a trigger 122 from the hashset change detection engine 120 indicating a change to a file of the file hosting service. Upon detection of the trigger, the workflow engine 124 initiates a specific workflow 126A-126M ("126") to perform pre-configured actions based on the change in the file. A workflow 126 is a series of automated operations that are needed to perform a task. The workflow 126 is initiated by the trigger 122. The operations of a workflow may be performed sequentially or in parallel.

In an aspect, the hashset change detection engine 120 is part of a business-to-business (B2B) enterprise where one business makes a commercial transaction with another business. The file hosting service 102 is associated with a first business that stores files representing orders for widgets that are provided by a second business associated with the client device 108. The orders are uploaded to the file hosting service 102 in a respective folder. The hashset change detection engine 120 of the client device 108 detects the changed file and sets the trigger 122 to the workflow engine 124.

The workflow engine 124 initiates the corresponding workflow 126 to fulfill the new order. The workflow 126 includes two or more tasks that may be executed on the client device or executed on multiple remote devices. The workflow facilitates processing within the second business's purchasing, manufacturing, sales, accounting, and/or enterprise resource planning services to fulfill the new order.

In another aspect, the file hosting service 102 may be part of a source code repository and the client device 108 is part of a version-control system that detects changes in source code files. The client device 108 detects a changed file and sets a trigger 122 to the workflow engine 124 that may perform one or more tasks based on the changed file. The workflow engine 124 may download the changed file, initiate a code review of the changes made to the changed file, select the peers to perform the code review, and/or email a notification of the changed file to each of the select peers.

Figure 2:
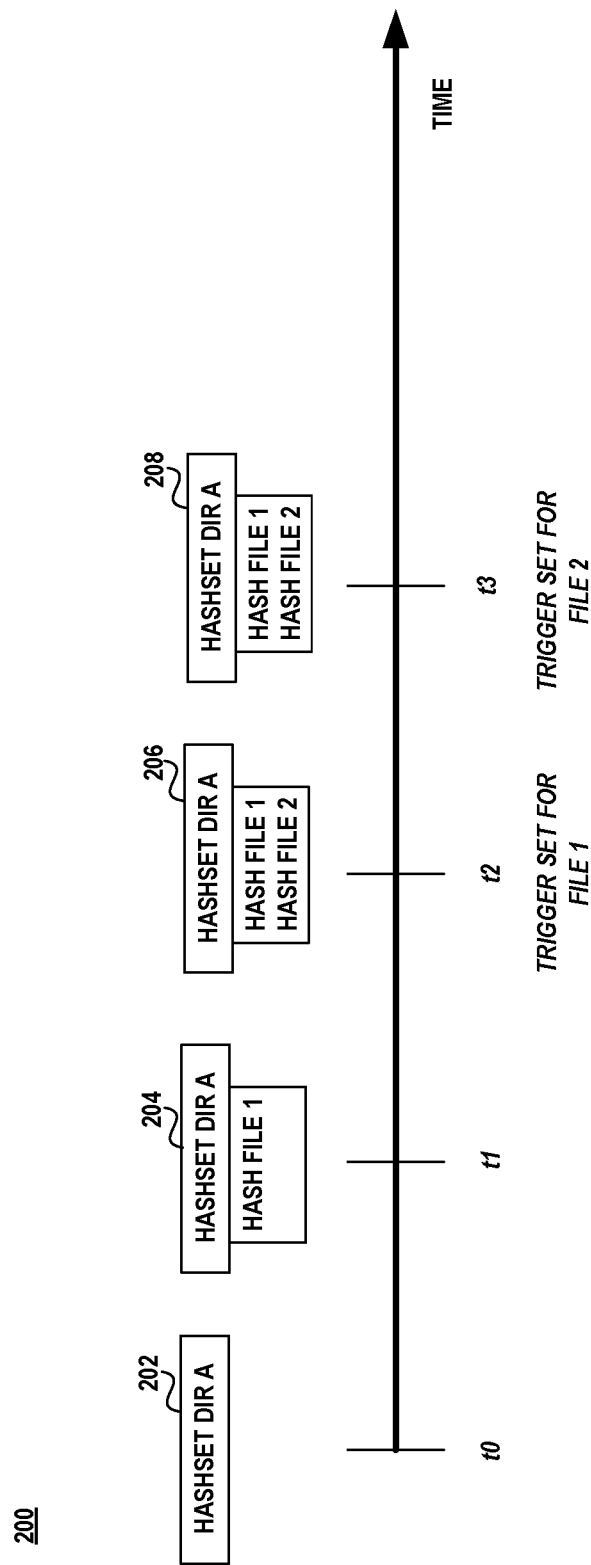
FIG. 2 is a schematic diagram illustrating an exemplary timeline of the client-side hashset change detection.

Turning to FIG. 2 there is shown a timeline 200 of the creation of the hashsets for directory A. In this timeline the hashsets are generated at periodic time intervals. Initially at time $t_0$, the directory is empty and the hashset at time $t_0$ is empty 202. A time $t_1$, directory A includes file 1 and the hashset for directory A at time $t_1$ includes a hash for file 1 204. At time $t_2$, directory A includes file 1 and file 2 and the hashset for directory A at time $t_1$ includes a hash for file 1 and a hash for file 2 206. At time $t_3$, directory A includes file 1 and file 2 and the hashset at time $t_3$ includes a new hash for file 1 and a new hash for file 2 208.

In certain situations, a file may be changing at the same time the file's metadata is being downloaded by the client device. In this situation, the file may be detected as changed at two successive time intervals. In order to avoid this situation, the change is detected across the hashsets of two previous time intervals. If a file's hash at a current time interval t is contained in the previous hashset at time t−1 but not in the hashset of time t−2, then it means that the file was modified or added and the file stopped changing in between time interval t−2 and t−1 resulting in the same hash found in the hashset of time t and in the hashset of time t−1. The trigger is set to once instead of at two successive time intervals.

At time $t_2$, if the hash for file 1 is the same the hash for file 1 at time $t_1$ and there is no hash for file 1 in the hashset at time $t_0$, then at time $t_3$ file 1 is determined to have changed. At time $t_3$, if the hash for file 2 is contained in the hashset at time $t_2$ and there is no hash for file 2 in the hashset at time $t_1$, then at time $t_3$, file 2 is determined to have changed.

Figure 3:
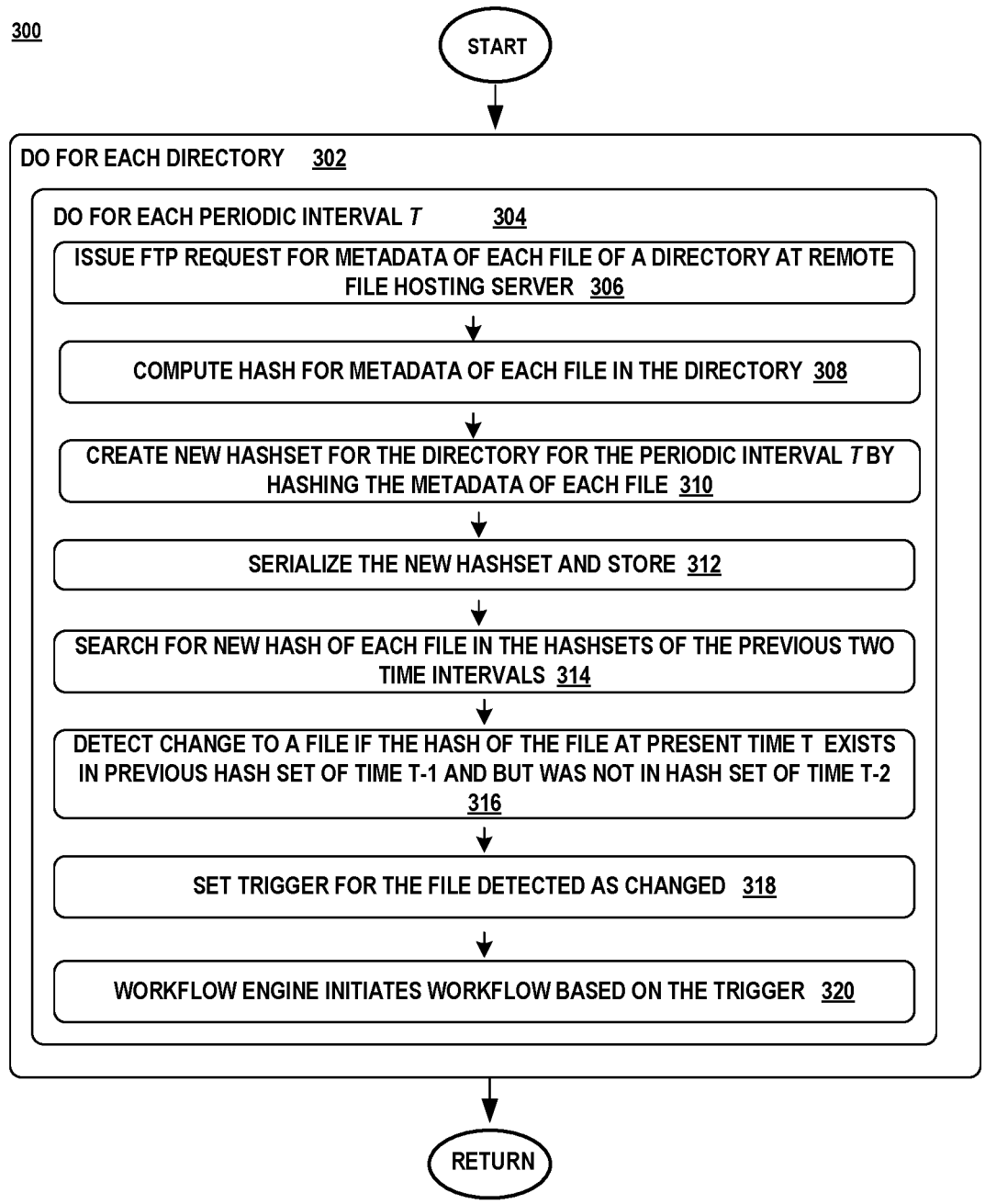
FIG. 3 is a flow diagram illustrating an exemplary method of the client-side hashset change detection.

Turning to FIG. 3, there is shown an exemplary method of the client-side hashset change detection 300. In an aspect, the method is performed for each specified directory of a file hosting service at a specified polling interval. The client device may be configured to monitor certain directories for file changes and may perform the hashset change detection at specified time intervals.

For each directory (block 302) and for each periodic polling interval (block 304), the client device issues an FTP request for the metadata of each file of a specified directory (block 306). Upon receiving the metadata of each file of the directory, a cryptographic hash function is used to generate a hash value for each file's metadata (block 308) and a new hashset for the current time interval is generated containing the new hash values (block 310). If the directory did not contain any files at the current time interval, no hashset is computed.

The hash values are serialized before storing them into the new hashset (block 312). Serialization is the process of converting the hash values into a form that can be stored or transmitted. In an aspect, the hash values are converted into a JavaScript Object Notation (JSON) object. This is done in order to reduce the memory size of the hashset.

The new hash value for each file is searched for in the immediately two previous hashsets (block 314). If the hash value for each file is not contained in both of the two previous hashsets, then the file has not changed. If the hash value for a file at the current time interval is contained in the immediately preceding time interval t−1 but not at the time interval t−2 then the file is determined to have changed (block 316). Otherwise, the file is not considered not to have been changed (block 316). In this case, the trigger is set (block 318).

When the trigger is set (block 318), the workflow engine activates a workflow to perform further actions on the changed file as noted above (block 320).

Figure 5:
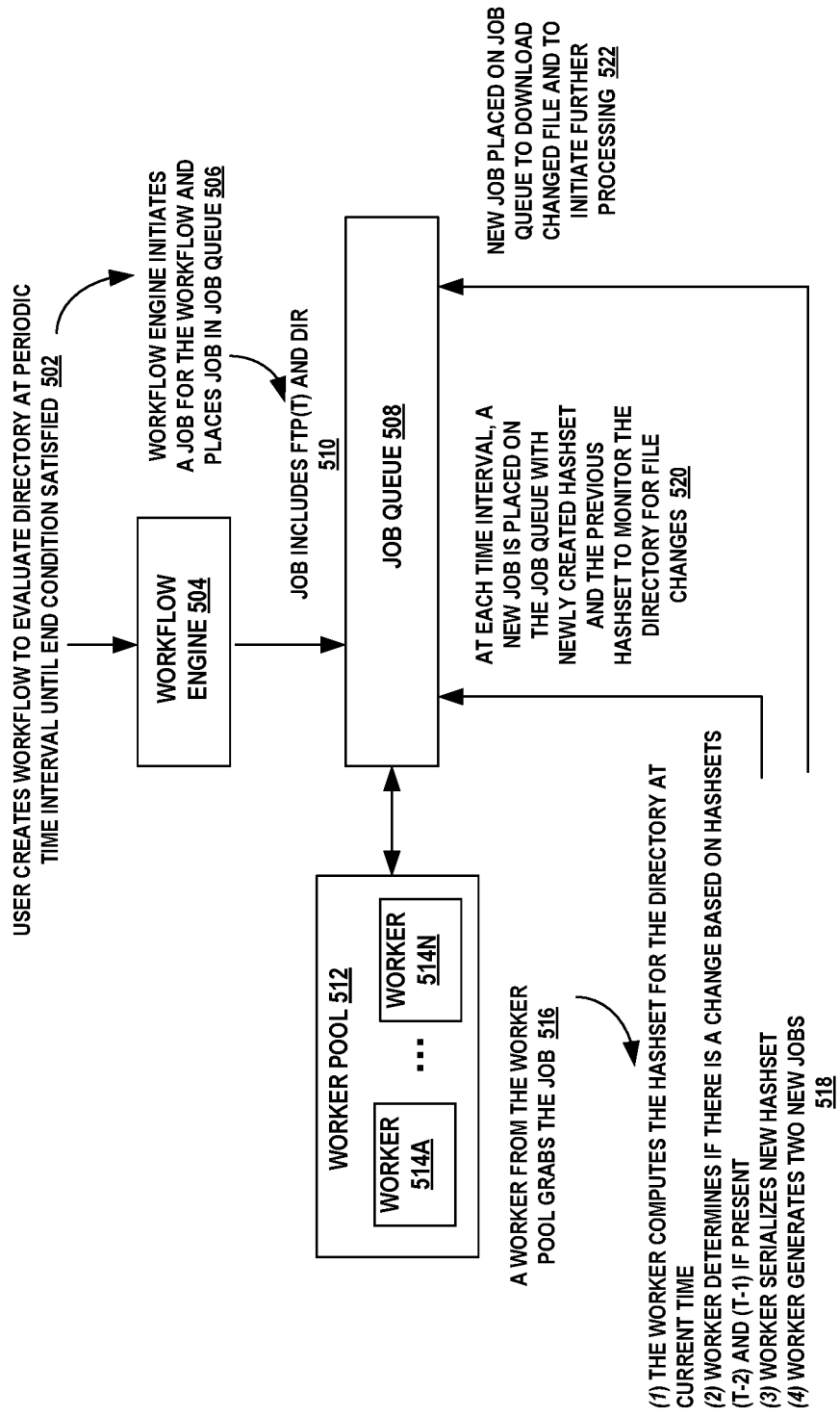
FIG. 5 is a schematic diagram illustrating a second exemplary process of the client-side hashset change detection.

Turning to FIG. 5, there is shown a second exemplary method of the client-side hash change detection process 500. A client device utilizes a workflow engine 504 coupled to a job queue 508 and a worker pool 512 of workers 514A-514N. The worker pool 512 may be a pool of threads. A thread of execution is a basic unit of CPU utilization, consisting of a program counter, a stack, and a set of registers. A thread of execution results from a fork of a computer program into two or more concurrently running tasks. The implementation of threads and processes differs from one operating system to another, but in most cases, a thread is contained inside a process. Multiple threads can exist within the same process and share resources such as memory, while different processes do not share these resources.

A user of the client device utilizes the workflow engine 504 to create a workflow to evaluate the state of a specified directory of the file hosting service at periodic intervals 506. The workflow includes the directory name, FTP server name, the periodic time interval and the ending condition 502. The workflow engine 504 initiates a job on the job queue 508 for the tasks of the workflow. The job includes the directory name, DIR, the FTP server name, the periodic time interval T and the ending condition 510. The periodic time interval is a user-defined setting which can be 5 minutes, 2 days, 30 seconds, etc.

A worker 514A-514N from the worker pool 512 grabs the job 516. The worker 514 interacts with the FTP server to obtain the metadata of all the files of the directory and computes a hashset for the directory as noted above. The worker 514 determines if there is a change in a file of the directory as noted above. The worker 514 serializes the hashset and generates one or two new jobs. A first job is to continue monitoring for a change to a file of the directory and which is to be performed at the next periodic time interval, time (t+1), where t is the current time. The first job is sent to the job queue 518 and contains the hashset at time t and the previous hashset t−1 in addition to the FTP server name, directory and end condition. The second job is to download the changed file when a change is detected and to initiate further processing with the change file 522. The process repeats for each time interval until end condition is satisfied.

In this aspect, the workflow engine maintains the state of the hashsets and the workers are stateless. Due to the decoupling of the client device's processes, the changed detection process can be dynamically scaled to accommodate any workload.

Exemplary Operating Environment

Figure 4:
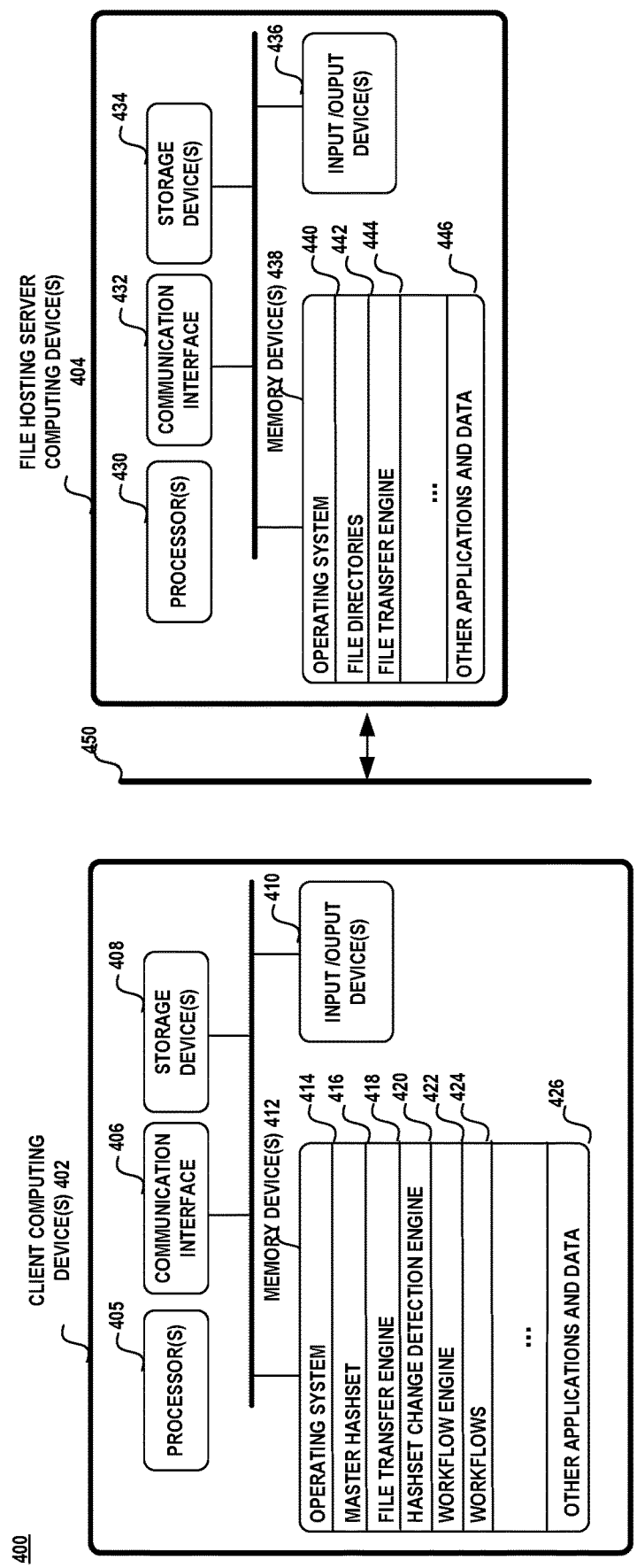
FIG. 4 is a block diagram illustrating an exemplary operating environment.

Attention now turns to a discussion of an exemplary operating environment 400. FIG. 4 illustrates an exemplary operating environment 400 in which one or more client computing devices 402 communicate with one or more computing devices of a file hosting server 404. However, it should be noted that the aspects disclosed herein is not constrained to any particular configuration of the computing devices.

A computing device 402, 404 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

A computing device 402, 404 may include one or more processors 405, 430, one or more communication interfaces 406, 432 one or more storage devices 408, 434 one or more memory devices or memories 412, 438 and one or more input/output devices 410, 436. A processor 405, 430 may be any commercially available or customized processor and may include dual microprocessors and multi-processor architectures. A communication interface 406, 432 facilitates wired or wireless communications between the computing devices and with other devices. A storage device 408, 434 may be computer-readable medium that does not contain propagating signals, such as modulated data signals transmitted through a carrier wave. Examples of a storage device 408, 434 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 408, 434 in a computing device 402, 404. The input/output devices 410, 436 may include a keyboard, mouse, pen, voice input device, touch input device, display, speakers, printers, etc., and any combination thereof.

A memory device or memory 412, 438 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 412, 438 may also include one or more external storage devices or remotely located storage devices that do not pertain to propagating signals, such as modulated data signals transmitted through a carrier wave.

A memory device 412, 438 may contain instructions, components, and data. A component is a software program that performs a specific function and is otherwise known as a module, program, and/or application. Memory device 412 includes an operating system 414, a master hashset 416, a file transfer engine 418, a hashset change detection engine 420, a workflow engine 422, one or more workflows 424, and other applications and data 426. The memory device 404 includes an operating system 440, one or more file directories 442, a file transfer engine 444, and other applications and data 446.

The computing devices 402, 404 may be communicatively coupled via a network 450. The network 450 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 450 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of determining a change to a shared file of a file hosting service that uses a file transfer protocol without support for an API to detect a file change. The technical features associated with addressing this problem are the hashsets of each directory taken at periodic intervals that include the hash values of the metadata of each file of a directory. The use of the hashsets over two periodic intervals and the use of two prior hashsets to determine a file change improves the detectability of a file change in light of inflight changes. The technical effect achieved is the increased accuracy of the detection of a file change.

The technique described herein is a technical improvement over prior solutions that relied on timestamps. The use of timestamps caused problems when the client failed to detect a changed file on the server due to a clock skew between the clock of the client and the clock of the server. If the clock time on the client is ahead even by a small margin, it can miss a file change. If the clock time on the client is behind the server, it may result in a false detection. Absolute time comparison is known to be very unreliable. The technique described herein avoids these issues by not using timestamps and instead using the hash values of the metadata.

Additionally, the detection of the file change is made on a client device without imposing a significant memory constraint. The hashsets do not consume a large amount of memory. The size of the hashsets scale linearly in proportion to the number of files in a directory. The exact size of a hashset depends on the hash function and the serialization of the hashset before storing the hashset. With a 128-bit hash computation using the MD5 hash function and a JSON serialization of the hashset, 25,000 files consume approximately 45 KB of storage space. Hence, the use of the hashsets is memory efficient.

CONCLUSION

A system is disclosed comprising: one or more processors; and a memory that stores one or more programs that are configured to be executed by the one or more processors, the one or more programs including instructions to perform actions that: maintain a plurality of hashsets at a client device, wherein a hashset comprises a plurality of hash values associated with a time, wherein a hash value is associated with metadata of a shared file of a directory of a remote file system; obtain from the remote file system, via a network protocol, metadata of each shared file of the directory of the remote file system; compute a hash value of a first shared file of the directory of the remote file system at a current time point t; search the plurality of hash sets for a hash value matching the new hash value from a hash set of time point t−1 and from a hash set of time point t−2; and detect a change in the first file when the new hash value at time point t is not contained in the hash set of time point t−2 and is contained in the hash set of time point t−1.

In an aspect, the one or more programs including instructions to perform actions that: upon detection of the change to the first file, set a trigger to a workflow engine indicating the change to the first file. In an aspect, the one or more programs including instructions to perform actions that: upon receipt of the trigger, the workflow engine initiates a workflow to obtain the changed first file. In an aspect, the one or more programs including instructions to perform actions that: poll the directory of the remote file system at periodic polling intervals to obtain the metadata or each shared file of the directory of the remote file system.

In an aspect, the metadata comprises a file name, a file size, a creation timestamp, and a modification timestamp. In an aspect, the network protocol comprises File Transfer Protocol (FTP), Secure Shell File Transfer Protocol (SFTP), or Samba. In aspect, the file transfer protocol differs from a web Application Programming Interface (API).

A computer-implemented method of a client device is disclosed, comprising: maintaining a master hashset comprising a plurality of hash values at time point $t_0$ and a plurality of hash values at time point $t_1$, a hash value associated with metadata of a shared file of a remote file system, wherein time point $t_1$ follows time point $t_0$; polling the remote file system, via a file transfer protocol, for metadata of a first shared file of the remote file system at time point $t_2$, wherein time point $t_2$ follows time point $t_1$; computing a new hash value of the metadata of the first shared file of the remote file system at time point $t_2$; determining if the master hashset at time $t_1$ contains the new hash value; determining if the master hashset time $t_0$ contains the new hash value; and setting a trigger to indicate the first shared file is changed when the master hashset at time $t_1$ contains the new hash value and the master hashset time $t_0$ does not contain the new hash value.

In an aspect, the method further comprises upon detection of the trigger, initiating a workflow to download the first shared file. In an aspect, the method further comprises polling the remote file system at periodic time intervals. In an aspect, the method further comprises serializing the new hash value prior to storing the new hash value in the hashset of time $t_2$. In an aspect, the serialization utilizes a JSON object as a serialization form. In an aspect, the metadata comprises a file name, a file size, a creation timestamp, and a modification timestamp. In an aspect, the network protocol comprises File Transfer Protocol (FTP), Secure Shell File Transfer Protocol (SFTP), or Samba. In an aspect, the network protocol differs from a web Application Programming Interface (API).

One or more hardware storage devices is disclosed having stored thereon computer executable instructions that are structured to be executable by one or more processors of a client device to thereby cause the client device to: poll a remote file hosting server to obtain metadata of shared files of the remote file hosting server through a network protocol, wherein the network protocol differs from a web application programming interface (API); maintain two hashsets for the shared files, wherein a first one of the two hashsets is associated with a first time point, wherein a second one of the two hashsets is associated with a time point that immediately precedes the first time point, wherein each of the two hashsets includes hash values of metadata of each file of the remote file hosting server; generate a hash value for a first shared file of the remote file hosting server at a current time point; determine if the hash value for the first shared file at the current time point is contained in the two hashsets; and identify the first shared file of the remote file hosting server as not changed when the hash value of the first shared file at the current time point is not contained in the first one of the two hashsets and the second one of the two hashsets.

In an aspect, the one or more hardware storage devices have stored thereon further computer executable instructions that are structured to be executable by one or more processors of a client device to thereby cause the client device to: determine that the first shared file of the remote file hosting server has changed when the hash value of the first shared file at the current time point is contained in the first one of the two hashsets and not contained in the second one of the two hashsets.

In an aspect, the one or more hardware storage devices have stored thereon further computer executable instructions that are structured to be executable by one or more processors of a client device to thereby cause the client device to: poll the remote file hosting server to obtain the metadata of the shared files of the remote file hosting server at periodic time intervals.

In an aspect, the metadata comprises a file name, a file size, a creation timestamp, and a modification timestamp. In an aspect, the one or more hardware storage devices of claim 16, wherein the network protocol comprises File Transfer Protocol (FTP), Secure Shell File Transfer Protocol (SFTP), or Samba.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

What is claimed:

1. A system comprising:
   one or more processors; and
   a memory that stores one or more programs that are configured to be executed by the one or more processors, the one or more programs including instructions to perform actions that:
   maintain a plurality of hashsets at a client device, wherein a hashset comprises a plurality of hash values of shared files of a directory of a remote file system, wherein each hashset is associated with a time point, wherein a hash value is associated with metadata of a shared file of the directory of the remote file system;
   obtain from the remote file system, via a network protocol, metadata of each shared file of the directory of the remote file system, wherein the network protocol comprises a file transfer protocol that differs from a web Application Programming Interface (API) and has no support for API access;
   compute a new hash value of a first shared file of the directory of the remote file system at a current time point t;
   search the plurality of hashsets for a hash value of the first shared file matching the new hash value from a hashset of time point t−1 and from a hashset of time point t−2;
   detect a change in the first shared file when the new hash value at time point t is not contained in the hashset of time point t−2 and is contained in the hashset of time point t−1;

upon detection of the change to the first shared file, set a trigger to a workflow engine indicating the change to the first shared file; and upon receipt of the trigger by the workflow engine, initiate a specific workflow from pre-configured actions based on the changed first shared file, wherein the workflow is a series of automated operations to perform a task.

2. The system of claim 1, wherein the one or more programs including instructions to perform actions that:

serialize the new hash value prior to storing the new hash value in the hashset of the current time point t.

3. The system of claim 2, wherein the serialization utilizes a JavaScript Object Notation (JSON) object as a serialization form.

4. The system of claim 1, wherein the one or more programs including instructions to perform actions that:

poll the directory of the remote file system at periodic polling intervals to obtain the metadata of each shared file of the directory of the remote file system.

5. The system of claim 1, wherein the metadata comprises a file name, a file size, a creation timestamp, and a modification timestamp.

6. The system of claim 1, wherein the network protocol comprises File Transfer Protocol (FTP), Secure Shell File Transfer Protocol (SFTP), or Samba.

7. A computer-implemented method of a client device, comprising:

maintaining a master hashset comprising a plurality of hash values at time point $t_0$ and a plurality of hash values at time point $t_1$, wherein the master hashset is associated with shared files of a directory of a remote file system, wherein a hash value is associated with metadata of a shared file of the remote file system, wherein time point $t_1$ follows time point $t_0$;

polling the remote file system, via a file transfer protocol, for metadata of a first shared file of the remote file system at time point $t_2$, wherein time point $t_2$ follows time point $t_1$, wherein the file transfer protocol differs from a web Application Programming Interface (API) and has no support for API access;

computing a new hash value of the metadata of the first shared file of the remote file system at time point $t_2$;

searching the master hashset for the new hash value at time point $t_1$ and at time point $t_0$;

detecting a change to the first shared file when the master hashset at time point $t_1$ contains the new hash value and the master hashset at time $t_0$ does not contain the new hash value;

setting a trigger to a workflow engine to indicate the first shared file is changed when the master hashset at time $t_1$ contains the new hash value and the master hashset at time $t_0$ does not contain the new hash value; and upon receiving the trigger at the workflow engine, initiating a specific workflow from pre-configured actions based on the first shared file, wherein the workflow is a series of automated operations to perform a task.

8. The computer-implemented method of claim 7, further comprising:

polling the remote file system at periodic time intervals.

9. The computer-implemented method of claim 7, further comprising:

serializing the new hash value prior to storing the new hash value in the hashset of time $t_2$.

10. The computer-implemented method of claim 9, wherein the serialization utilizes a JSON object as a serialization form.

11. The computer-implemented method of claim 7, wherein the metadata comprises a file name, a file size, a creation timestamp, and a modification timestamp.

12. The computer-implemented method of claim 7, wherein the file transfer protocol comprises File Transfer Protocol (FTP), Secure Shell File Transfer Protocol (SFTP), or Samba.

13. One or more hardware storage devices having stored thereon computer executable instructions that are structured to be executable by one or more processors of a client device to thereby cause the client device to:

poll a remote file hosting server to obtain metadata of shared files of the remote file hosting server through a network protocol, wherein the network protocol comprises a file transfer protocol that differs from a web Application Programming Interface (API) and has no support for API access;

maintain two hashsets for the shared files, wherein a first one of the two hashsets is associated with a first time point, wherein a second one of the two hashsets is associated with a second time point that immediately follows the first time point, wherein each of the two hashsets includes hash values of metadata of each shared file of the remote file hosting server;

generate a hash value for a first shared file of the remote file hosting server at a current time point;

search for the hash value for the first shared file at the current time point in each of the two hashsets;

detect a change in the first shared file when the hash value at the current time point is contained in the first one of the two hashsets and is not contained in the second one of the two hashsets;

upon detection of the change to the first shared file, set a trigger to a workflow engine indicating the change to the first shared file; and upon receipt of the trigger by the workflow engine, initiate a specific workflow from pre-configured actions based on the changed first shared file, wherein the workflow is a series of automated operations to perform a task.

14. The one or more hardware storage devices of claim 13, having stored thereon further computer executable instructions that are structured to be executable by one or more processors of a client device to thereby cause the client device to:

determine that the first shared file of the remote file hosting server has not changed when the hash value of the first shared file at the current time point is contained in the first one of the two hashsets and not contained in the second one of the two hashsets.

15. The one or more hardware storage devices of claim 13, having stored thereon further computer executable instructions that are structured to be executable by one or more processors of a client device to thereby cause the client device to:

poll the remote file hosting server to obtain the metadata of the shared files of the remote file hosting server at periodic time intervals.

16. The one or more hardware storage devices of claim 13, wherein the metadata comprises a file name, a file size, a creation timestamp, and a modification timestamp.

17. The one or more hardware storage devices of claim 13, wherein the network protocol comprises File Transfer Protocol (FTP), Secure Shell File Transfer Protocol (SFTP), or Samba.

\* \* \* \* \*